United States Patent
Conzola et al.

(10) Patent No.: US 9,256,847 B2
(45) Date of Patent: Feb. 9, 2016

(54) DETECTION, IDENTIFICATION AND INTEGRATION OF OFFICE SQUATTERS

(71) Applicant: International Business Machines Corporation, Armonk, NY (US)

(72) Inventors: Vincent C. Conzola, Raleigh, NC (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 13/630,549

(22) Filed: Sep. 28, 2012

(65) Prior Publication Data

US 2014/0091928 A1 Apr. 3, 2014

(51) Int. Cl.
G08B 21/00 (2006.01)
G06Q 10/06 (2012.01)

(52) U.S. Cl.
CPC .................. *G06Q 10/0631* (2013.01)

(58) Field of Classification Search
CPC .................. G06Q 10/02; G06Q 10/06
USPC ............... 340/5.2, 5.21, 5.28, 5.3, 5.31, 5.32, 340/541; 705/7.12, 7.13
See application file for complete search history.

(56) References Cited

U.S. PATENT DOCUMENTS

| | | | |
|---|---|---|---|
| 6,204,762 B1* | 3/2001 | Dering et al. | 340/541 |
| 7,602,770 B2 | 10/2009 | Mulberg et al. | |
| 2003/0080876 A1* | 5/2003 | Martin | 340/870.02 |
| 2003/0149609 A1* | 8/2003 | Kasahara | 705/9 |
| 2005/0159969 A1 | 7/2005 | Sheppard | |
| 2007/0162315 A1* | 7/2007 | Hodges | 705/8 |
| 2008/0109289 A1 | 5/2008 | Vivadelli et al. | |
| 2010/0171430 A1 | 7/2010 | Seydoux | |
| 2010/0189094 A1 | 7/2010 | Gray et al. | |
| 2010/0283580 A1* | 11/2010 | Sheng et al. | 340/5.31 |
| 2013/0054033 A1* | 2/2013 | Casilli | 700/276 |

FOREIGN PATENT DOCUMENTS

GB 2425853 A 8/2006

OTHER PUBLICATIONS

"Employer-Employee Balanced and Dynamic Workplace Seating System". Technical Disclosure. IP.com Prior Art Database. IP.com No. IPCOM000217995D. IP.com Electronic Publication: May 15, 2012. Prior Art Database at: http://priorartdatabase.com/IPCOM/000217995.

Harrison, A. and Cairns, A. "The Changing Academic Workplace". Published in 2008 as part of the research study 'Effective Spaces for Working in Higher and Further Education' undertaken by DEGW UK Ltd.

(Continued)

*Primary Examiner* — Mark Rushing
(74) *Attorney, Agent, or Firm* — Jinesh P. Patel; Jennifer M. Anda

(57) ABSTRACT

A computer receives a reservation for a location. The computer detects if a user is present in the location. The computer then determines if the user is allowed to be present in the location by comparing identification information of the user with identification information of the reservation.

23 Claims, 3 Drawing Sheets

(56) References Cited

OTHER PUBLICATIONS

Millward, L. et al. "Putting Employees in Their Place: The Impact of Hot Desking on Organizational and Team Identification". OrganizationScience vol. 18, No. 4, Jul.-Aug. 2007, pp. 547-559.

Parkin, S. et al. "A Stealth Approach to Usable Security: Helping IT Security Managers to Identify Workable Security Solutions". NSPW'10, Sep. 21-23, 2010, Concord, MA.

Price, I. "Flexible Working Policies and Environments in UK Local Authorities: Current Practice". RICS Foundation, Sheffield, UK, Oct. 2001.

Teixeira, T. and Savvides, A. "Lightweight People Counting and Localizing in Indoor Spaces Using Camera Sensor Nodes". First ACM/IEEE International Conference on Distributed Smart Cameras, 2007. ICDSC '07.

* cited by examiner

DETECTION, IDENTIFICATION AND INTEGRATION OF OFFICE SQUATTERS

FIELD OF THE INVENTION

The present invention relates generally to GPS tracking, and more particularly to detecting, identifying and integrating office squatters using GPS tracking.

BACKGROUND

Companies are always looking for creative ways to save money. One method companies are undertaking to reduce overhead is to encourage employees to work from home in order to save on costs associated with renting and maintaining office space. That is not to say that companies have gone completely virtual. Companies still typically prefer to keep office space in order to maintain an official presence. However, a company may lease or buy a smaller amount of office space to help reduce some of the aforementioned overhead costs. This in turn creates an issue where the office space is not large enough to accommodate all of a company's employees at a given time. While many employees may be able to perform most of their tasks from home, an office may still be necessary in certain cases, such as, when meeting a client face to face. To resolve this issue, many companies designate some offices as "shared" offices. Telecommuting employees reserve the office ahead of time and are given full use of the office for the reserved period of time. This can lead to complications, however, if, for example, an employee reserves a shared office only to find out that it is being used by a "squatting" employee, i.e., an employee who has not made a reservation.

SUMMARY

Embodiments of the present invention provide a system, method, and program product for identifying and detecting an office squatter. A computer receives a reservation for a location. The computer detects if a user is present in the location. The computer then determines if the user is allowed to be present in the location by comparing identification information of the user with identification information of the reservation. If the computer determines the user is allowed to be present in the location, the computer sends the user information regarding the location, records the period of time the user remains present in the location, and designates the user as a preferred user for the location. If the computer determines the user is not allowed to be present in the location, the computer determines if the user is eligible for access to the location. If the user is eligible, the computer provides the user with access to the location and records the period of time the user remains present in the location. If the user is not eligible, the computer searches for a subsequent nearby available location and notifies the user to move there. If the computer cannot find another nearby available location, the computer notifies the user to move outside of the location before a threshold period of time is surpassed. If the computer detects that the user has not moved outside of the location before the threshold period of time is surpassed, the computer disconnects the telephone and electrical service to the location and notifies the user's supervisor.

DETAILED DESCRIPTION

Figure 1:
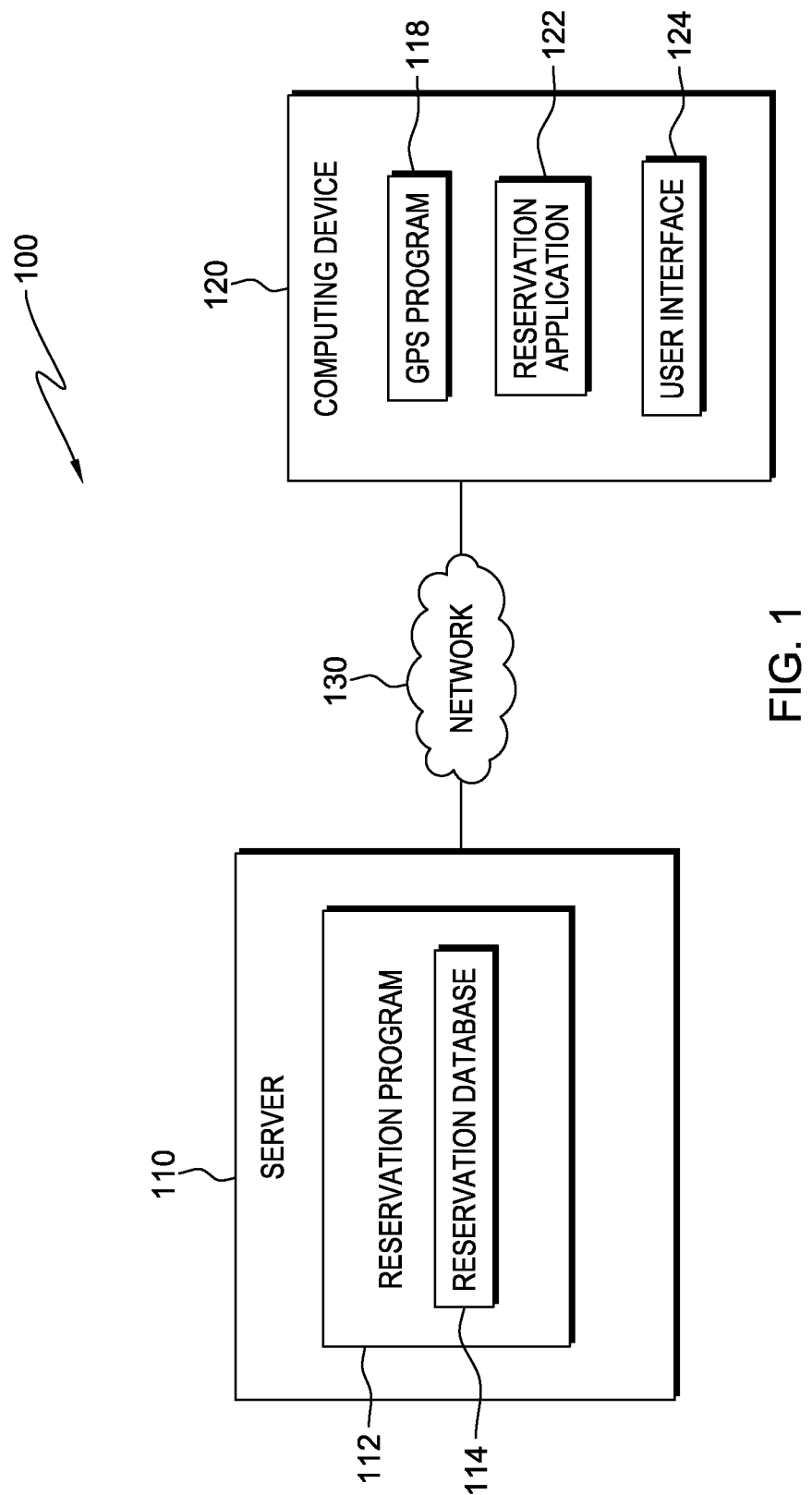
FIG. 1 illustrates an office reservation detection system, in accordance with an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer or other programmable apparatus, provide processes for implementing the functions/acts specified in the flowchart and/or block diagram block or blocks.

Embodiments of the present invention will now be described in detail with reference to the accompanying Figures.

FIG. 1 illustrates office reservation detection system 100, in accordance with an embodiment of the invention. Office reservation detection system 100 includes server 110 and computing device 120, interconnected over network 130.

In an exemplary embodiment, network 130 is the Internet, representing a worldwide collection of networks and gateways to support communications between devices connected to the Internet. In the exemplary embodiment, network 130 is also a collection of networks and gateways capable of communicating global-positioning information between devices connected to the network. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between server 110 and computing device 120, in accordance with embodiments of the invention.

Computing device 120 includes GPS module 118, user interface 124 and reservation application 122. Computing device 120 may be a desktop computer, a notebook, a laptop computer, a tablet computer, a handheld device, a smart phone, a thin client, or any other electronic device or computing system capable of receiving and sending data to and from server 110 via network 130. Computing device 120 is described in more detail with reference to FIG. 3.

GPS module 118 includes components used to receive requests for, determine and send information regarding the location of computing device 120 to server 110 via network 130. In an exemplary embodiment, GPS module 118 is a hardware device capable of sending location information, in the form of GPS coordinates, in response to a location query received from another device, such as server 110. In other embodiments, GPS module 118 may be a firmware device or a software application.

User interface 124 includes components used to receive input from a user and transmit the input to an application residing on computing device 120. In an exemplary embodiment, user interface 124 uses a combination of technologies and devices, such as device drivers, to provide a platform to enable users of computing device 120 to interact with reservation application 122. In the exemplary embodiment, user interface 124 receives input, such as textual input received from a physical input device, such as a keyboard, via a device driver that corresponds to the physical input device.

Reservation application 122 is a software application capable of receiving shared office reservation information from a user of computing device 120 via user interface 124 and transmitting the information to another computing device, such as server 110, via network 130.

Server 110 includes reservation program 112. Server 110 may be a desktop computer, a notebook, a laptop computer, a tablet computer, a handheld device, a smart phone, a thin client, or any other electronic device or computing system capable of receiving and sending data to and from computing device 120 via network 130. Server 110 is described in more detail with reference to FIG. 3.

Reservation program 112, which includes reservation database 114, also includes components to analyze location information and shared office space reservation information received from computing device 120 via network 130. The operation of reservation program 112 is described in further detail below with reference to FIG. 2.

Reservation Database 114 is a file that contains all shared office space reservations received by reservation program 112. In an exemplary embodiment, reservations are received by reservation program 112 via network 130 and stored in reservation database 114 for future reference. While reservation database 114 is shown as a fully integrated component of reservation program 112, in other embodiments, reservation database 114 can be partially integrated with reservation program 112 or a completely separate component.

Figure 2:
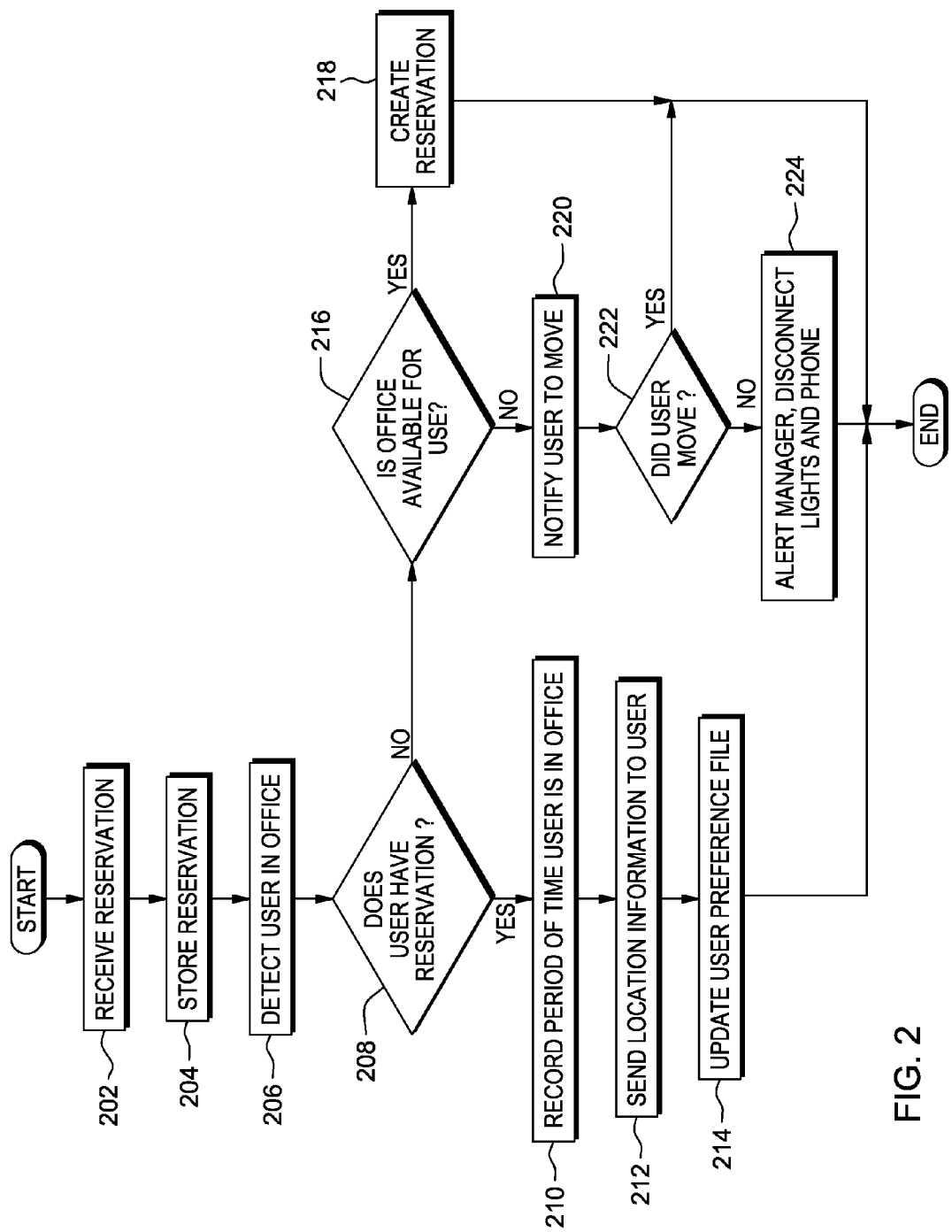
FIG. 2 is a flowchart illustrating the operations of the reservation program of FIG. 1 in determining if an employee has a reservation to use an office, in accordance with an embodiment of the invention.

FIG. 2 is a flowchart illustrating the operations of reservation program 112 in determining if an employee has a reservation to use an office, in accordance with an exemplary embodiment of the invention. In an exemplary embodiment, reservation program 112 receives a reservation for an office space from computing device 120 via network 130 (step 202). In the exemplary embodiment, the user of computing device 120 creates the reservation by inputting reservation information into reservation application 122 via user interface 124. The reservation information is then transmitted to server 110 via network 130 for processing by reservation program 112. In other embodiments, the user of computing device 120 can create the reservation by submitting input into a web-based user interface, such as an office reservation website. Reservation program 112 then stores the reservation in reservation database 114 (step 204).

Reservation program 112 then detects that the user of computing device 120 is in the office (step 206). In the exemplary embodiment, this step is accomplished by reservation program 112 communicating with GPS module 118 via network 130 and receiving information regarding the location of computing device 120. In the exemplary embodiment, reservation database 114 includes a GPS module ID-to-user ID database, which matches each user ID to a GPS module ID number. Reservation program 112 uses this GPS module ID-to-user ID database to identify the user of computing device 120. While in the exemplary embodiment, reservation program 112 detects the user of computing device 120 via GPS, in other embodiments, reservation program 112 can use a variety of other detection means such as cameras coupled with face recognition software, radio-frequency identification or inertial measurement units. For this step, it is assumed that the location of computing device 120 is equivalent to the location of the user of computing device 120.

When reservation program 112 detects that the user of computing device 120 is in the office (step 206), reservation program 112 determines if the user of computing device 120 has a reservation to use the office (decision 208). In the exemplary embodiment, this step is accomplished by reservation program 112 first analyzing each reservation within reservation database 114 and verifying if there is a reservation containing identification information matching that of the user of computing device 120. After verifying the identification information of the user of computing device 120 matches a reservation, reservation program 112 also verifies that the reserved office specified in the reservation matches the office the user of computing device 120 is currently present in and the current time in the time zone of the user of computing device 120 is contained within the reserved period of time specified in the reservation.

If reservation program 112 determines the user of computing device 120 has a reservation to use the office (decision 208, "YES" branch), reservation program 112 records the period of time that the user of computing device 120 is present in the office (step 210). In the exemplary embodiment, reservation program 112 determines the period of time the user of computing device 120 is present in the office by analyzing information regarding the location of computing device 120 received from GPS module 118 to determine when the user of computing device 120 enters and exits the office. In the exemplary embodiment, this period of time is stored in reservation database 114. If reservation program 112 determines the user of computing device 120 has a reservation to use the office (decision 208, "YES" branch), reservation program 112 also sends location information to the user (step 212). Location information may include information such as emergency exit locations/procedures, vending machine locations or the locations of available restrooms, which, in the exemplary embodiment, is included in reservation database 114 for each office location. In the exemplary embodiment, reservation program 112 sends location information for the relevant office in the form of a textual message or notification, such as a pop-up message or an email, to computing device 120 via network 130. If reservation program 112 determines the user of computing device 120 has a reservation to use the office (decision 208, "YES" branch), reservation program 112 also updates the preference file of the user of computing device 120 in reservation database 114 (step 214). By updating the preference file of the user of computing device 120, reservation program 112 gives the office greater weight, thereby increasing the likelihood that the user of computing device 120 will be assigned the same office in future reservations.

If reservation program 112 determines the user of computing device 120 does not have a reservation to use the office (decision 208, "NO" branch), reservation program 112 determines if the office is available for use (decision 216). To accomplish this step, reservation program 112 searches for an existing reservation for the office in reservation database 114. If reservation program 112 determines the office is available for use (decision 216, "YES" branch), reservation program 112 creates a reservation for the office (step 218). In the exemplary embodiment, reservation program 112 first determines how long the office is available for use. For example, if there is a reservation for the office in 2 hours, reservation program 112 creates a reservation for the user of computing device 120 to use the office for a period of 2 hours. In the exemplary embodiment, reservation program 112 notifies the user of computing device 120, for example, by email, that the office is only available for a period of two hours and after such time period the user of computing device 120 must vacate. In the exemplary embodiment, reservation program 112 also records the period of time that the user of computing device 120 is present in the office. In the exemplary embodiment, reservation program 112 determines the period of time the user of computing device 120 is present in the office by analyzing information regarding the location of computing device 120 received from GPS module 118 to determine when the user of computing device 120 enters and exits the office. In the exemplary embodiment, this period of time is stored in reservation database 114.

If reservation program 112 determines the office is not available for use (decision 216, "NO" branch), reservation program 112 notifies the user of computing device 120 to move out of the office (step 220). In the exemplary embodiment, reservation program 112 notifies the user of computing device 120 by way of a textual message, such as a pop-up message or an email, via network 130. In the exemplary embodiment, reservation program 112 may direct the user of computing device 120 to move to another nearby office, if one is available. Reservation program 112 can determine which nearby offices are available by analyzing existing reservations in reservation database 114. If a nearby office is available and the user of computing device 120 chooses to move there, reservation program 112 can create a reservation for the user of computing device 120 for the nearby office. If reservation program 112 creates a reservation for the user of computing device 120 for the nearby office, in the exemplary embodiment, reservation program 112 also records the period of time that the user of computing device 120 is present in the office. In the exemplary embodiment, reservation program 112 determines the period of time the user of computing device 120 is present in the office by analyzing information regarding the location of computing device 120 received from GPS module 118 to determine when the user of computing device 120 enters and exits the office. In the exemplary embodiment, this period of time is stored in reservation database 114.

Reservation program 112 then determines if the user of computing device 120 moved out of the office (decision 222). In the exemplary embodiment, reservation program 112 gives the user of computing device 120 a small period of time, such as 5 minutes, to leave the office. If the user of computing device 120 does not leave the office after the small period of time is up (decision 222, "NO" branch), reservation program 112 notifies the user's manager that the user has been non-compliant, disconnects the phone line in the office and turns off the lights in the office (step 224). In the exemplary embodiment, reservation program 112 identifies the manager of the user of computing device 120 by analyzing user information and notifies the manager of the user's noncompliance by way of a textual message or e-mail. In the exemplary embodiment, reservation program 112 disconnects the phone line and turns off the lights in the office by communicating with the central mainframe computing device for the office. In the exemplary embodiment, reservation program 112 also records the period of time that the user of computing device 120 is present in the office, in the same manner as described above in step 210. In other embodiments, reservation program 112 does not enable the phone line or lights to be used until a user with a valid reservation is detected in the office. In the exemplary embodiment, once reservation program 112 disconnects the phone line and turns the lights off, the phone stays disconnected and the lights remain off until a user with a valid reservation for the office enters. Once again, the location of a user with a valid reservation is detected by reservation program 112 communicating with a GPS module in a computing device of the user and receiving information regarding the location of the user.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 3:
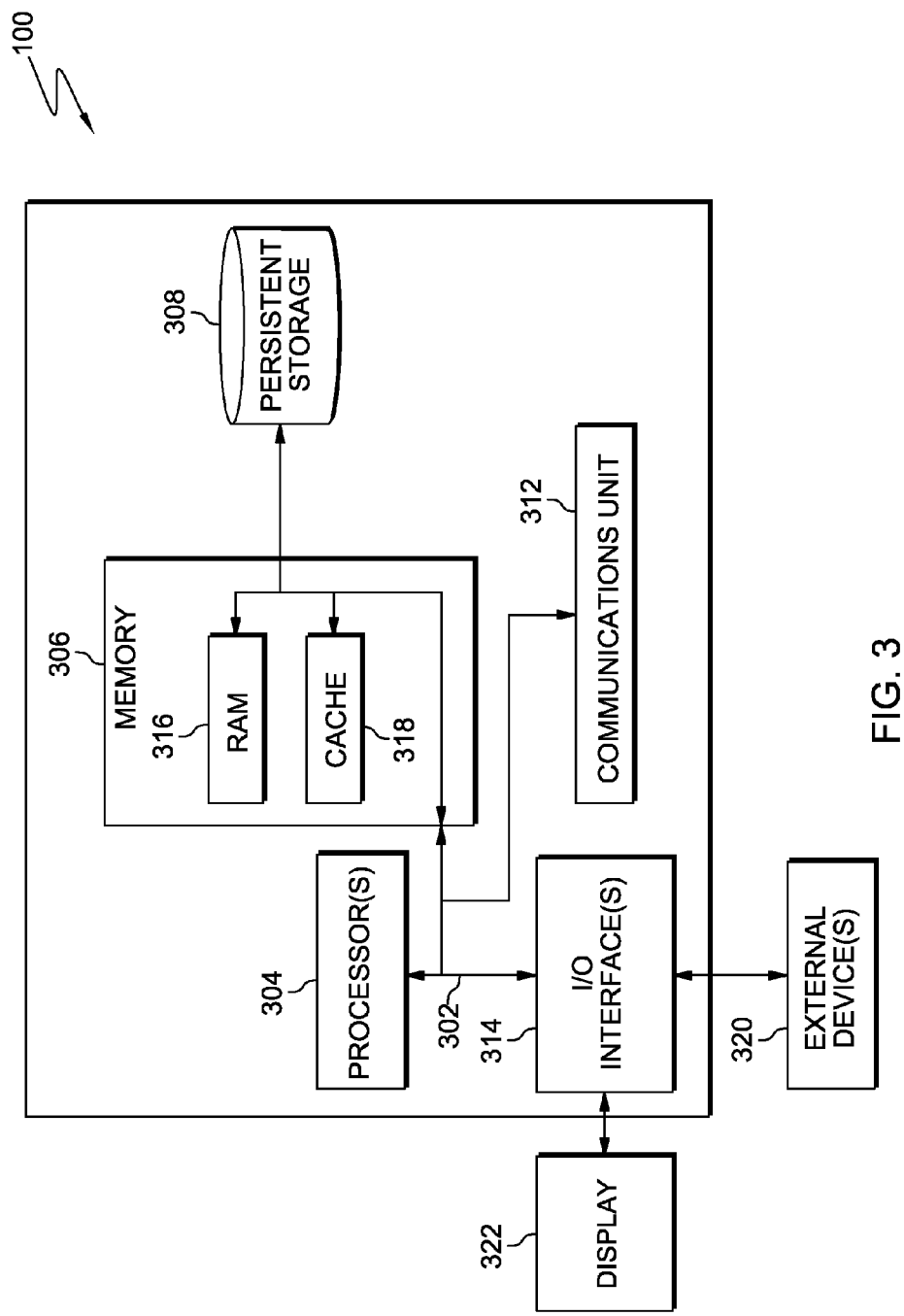
FIG. 3 is a block diagram depicting the hardware components of the office reservation detection system of FIG. 1, in accordance with an embodiment of the invention.

FIG. 3 depicts a block diagram of components of server 110 and computing device 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 110 and computing device 120 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs reservation program 112, and reservation database 114, in server 110, and the programs GPS module 118, reservation application 122, and user interface 124, in computing device 120, are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs reservation program 112, and reservation database 114, in server 110, and programs GPS module 118, reservation application 122, and user interface 124, in computing device 120, may be downloaded to persistent storage 308 through communications unit 312.

I/O interface(s) 314 allows for input and output of data with other devices that may be connected to server 110 and computing device 120. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., programs reservation program 112 and reservation database 114 in server 110, and programs GPS module 118, reservation application 122, and user interface 124, in computing device 120, can be stored on such portable computer-readable storage media and can be loaded onto persistent storage 308 via I/O interface(s) 314. I/O interface(s) 314 also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for detecting and identifying a user, comprising the steps of:
   receiving a reservation for a location;
   detecting, by a detection device, a GPS module associated with the user is present in the location, wherein the detection device is utilized to determine the location of the GPS module and wherein a GPS identification number is retrieved from the GPS module and compared to a database in order to determine a user identification number associated with the user;
   determining if the user is allowed to be present in the location by comparing the user identification number of the user with identification information of the reservation; and
   responsive to determining the user is allowed to be present in the location, sending information detailing the layout of the location to the user.

2. The computer implemented method of claim 1, further comprising:
   responsive to determining the user is allowed to be present in the location, recording a period of time the user remains present in the location.

3. The computer implemented method of claim 1, further comprising:
   responsive to determining the user is allowed to be present in the location, designating the user as a preferred user for the location, wherein designating the user as a preferred user comprises updating a preference file associated with the user in order to make it more likely that the user receives a reservation for the location in the future, and wherein designating the user as a preferred user for the location does not give the user exclusive access to the location.

4. The computer implemented method of claim 1, further comprising:
   responsive to determining the user is not allowed to be present in the location, notifying the user to vacate the location.

5. The computer implemented method of claim 1, further comprising:
   responsive to determining the user is not allowed to be present in the location, determining a subsequent location for the user to move to by analyzing existing reservations; and
   notifying the user to move to the determined subsequent location.

6. The computer implemented method of claim 1, further comprising:
   responsive to determining the user is not allowed to be present in the location, notifying the user to move outside of the location before a threshold period of time is surpassed; and
   detecting that the user did not move outside of the location before the threshold period of time was surpassed.

7. The computer implemented method of claim 6, further comprising:
   disconnecting telephone and electrical service to the location.

8. The computer implemented method of claim 6, further comprising:
   notifying a supervisor that the user did not move outside of the location before the threshold period of time was surpassed.

9. The computer implemented method of claim 1, further comprising:
   responsive to determining the user is not allowed to be present in the location, determining the user is eligible for access to the location.

10. The computer implemented method of claim 9, further comprising:
    providing the user with access to the location.

11. The computer implemented method of claim 9, further comprising:
    recording a period of time the user remains present in the location.

12. A computer program product detecting and identifying a user, the computer program product comprising:
    one or more computer-readable storage devices and program instructions stored on at least one of the one or more tangible storage devices, wherein, as used herein, one or more computer-readable storage devices is not to be construed as being transitory signals per se, the program instructions comprising:
    program instructions to receive a reservation for a location;
    program instructions to utilize a detection device to detect a GPS module associated with the user is present in the location, wherein the detection device is utilized to determine the location of the GPS module and wherein a GPS identification number is retrieved from the GPS module and compared to a database in order to determine a user identification number associated with the user; and
    program instructions to determine if the user is allowed to be present in the location by comparing the user identification number of the user with identification information of the reservation; and
    responsive to determining the user is allowed to be present in the location, program instructions to send information detailing the layout of the location to the user.

13. The computer program product of claim 12, further comprising:
    responsive to determining the user is allowed to be present in the location, program instructions to record a period of time the user remains present in the location.

14. The computer program product of claim 12, further comprising:
    responsive to determining the user is allowed to be present in the location, program instructions to designate the user as a preferred user for the location, wherein designating the user as a preferred user comprises updating a preference file associated with the user in order to make it more likely that the user receives a reservation for the location in the future, and wherein designating the user as a preferred user for the location does not give the user exclusive access to the location.

15. The computer program product of claim 12, further comprising:
    responsive to determining the user is not allowed to be present in the location, program instructions to notify the user to vacate the location.

16. The computer program product of claim 12, further comprising:
    responsive to determining the user is not allowed to be present in the location, program instructions to determine a subsequent location for the user to move to by analyzing existing reservations; and
    program instructions to notify the user to move to the determined subsequent location.

17. The computer program product of claim 12, further comprising:
   responsive to determining the user is not allowed to be present in the location, program instructions to notify the user to move outside of the location before a threshold period of time is surpassed; and
   program instructions to detect that the user did not move outside of the location before the threshold period of time was surpassed.

18. The computer program product of claim 17, further comprising:
   program instructions to disconnect telephone and electrical service to the location.

19. The computer program product of claim 17, further comprising:
   program instructions to notify a supervisor that the user did not move outside of the location before the threshold period of time was surpassed.

20. The computer program product of claim 12, further comprising:
   responsive to determining the user is not allowed to be present in the location, program instructions to determine the user is eligible for access to the location.

21. The computer program product of claim 20, further comprising:
   program instructions to provide the user with access to the location.

22. The computer program product of claim 20, further comprising:
   program instructions to record a period of time the user remains present in the location.

23. A computer system for estimation of time to respond to a chat message, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, the program instructions comprising:
   program instructions to receive a reservation for a location;
   program instructions to utilize a detection device to detect a GPS module associated with the user is present in the location, wherein the detection device is utilized to determine the location of the GPS module and wherein a GPS identification number is retrieved from the GPS module and compared to a database in order to determine a user identification number associated with the user; and
   program instructions to determine if the user is allowed to be present in the location by comparing the user identification number of the user with identification information of the reservation; and
   responsive to determining the user is allowed to be present in the location, program instructions to send information detailing the layout of the location to the user.

\* \* \* \* \*